United States Patent [19]

Geise

[11] Patent Number: 4,743,149
[45] Date of Patent: May 10, 1988

[54] HEADER TUBE TOOL

[75] Inventor: Samuel C. Geise, Memphis, Tenn.

[73] Assignee: Specialty Tool Co., Inc., Memphis, Tenn.

[21] Appl. No.: 25,378

[22] Filed: Mar. 13, 1987

[51] Int. Cl.$^4$ ............................................. B23C 3/02
[52] U.S. Cl. ........................... 409/179; 408/72 R; 408/79; 409/199
[58] Field of Search ............... 408/72 R, 72 B, 80, 408/81; 409/138, 143, 178, 179, 199

[56] References Cited

U.S. PATENT DOCUMENTS

| | | | |
|---|---|---|---|
| 2,177,103 | 10/1939 | Green | 409/179 |
| 2,304,405 | 12/1942 | Green | 409/179 |
| 2,401,490 | 6/1946 | Little | 408/72 |
| 2,682,181 | 6/1954 | Foth et al. | 409/178 |
| 2,749,809 | 6/1956 | Anderson | 408/80 |
| 3,164,062 | 1/1965 | Kogden et al. | 409/179 |
| 3,175,465 | 3/1965 | Fuller et al. | 409/179 |
| 3,286,553 | 11/1966 | Spencer et al. | 408/79 |
| 3,386,337 | 6/1968 | Spier | 409/179 |

Primary Examiner—Gil Weidenfeld
Assistant Examiner—Daniel W. Howell
Attorney, Agent, or Firm—Walker & McKenzie

[57] ABSTRACT

A tool for removing material from a body about the circumference of an aperture through the body. The tool includes guide structure for fitting into the aperture, the guide structure having a major axis which is maintained in alignment with the longitudinal axis of the aperture when the guide structure is fitted into the aperture; includes a cutting assembly for selectively cutting material from the body about the circumference of the aperture; and includes attachment structure attaching the cutting assembly to the guide structure for arranging the cutting assembly at a specific location relative to the longitudinal of the guide structure.

5 Claims, 4 Drawing Sheets

HEADER TUBE TOOL

BACKGROUND OF THE INVENTION

1. Field of the Invention

The present invention relates, in general, to a tool for removing material from a body about the circumference of an aperture through the body.

2. Description of the Related Art

It is often necessary in steam generating plants, and the like, to replace existing boiler tubes. One problem that arises when such boiler tubes are replaced is the difficulty of removing the tubes from the boiler header and preparing the boiler header to receive a replacement tube. The typical method now used consists of first cutting the boiler tube off using a typical metal cutting saw or the like at a location as close to the boiler header as possible, then using an electric arc cutting torch or gouge to cut out the portion of the boiler tube remaining attached to the boiler header and the weld used to attach the boiler tube to the boiler header, and then using a hand grinder to clean up the boiler header. A replacement boiler tube is then welded to the boiler header. It normally requires a trained worker 4 hours or more to properly remove an existing boiler tube and prepare the boiler header to receive a replacement boiler tube using such prior art methods and means. Additionally, such prior art methods and means adversely affect the boiler header by creating excessive heat at or adjacent the boiler header which changes the physical properties of the boiler header adjacent the boiler tube and resulting in possible failure of the boiler header (such boiler headers may cost upwards of $1,000,000.00), etc.

SUMMARY OF THE INVENTION

The present invention is directed toward providing an improved means for removing metal, or the like, from a body about the circumference of an aperture through the body. The concept of the present invention is to provide a high speed cutting tool that can be manually rotated about the aperture to quickly remove metal from the outer circumference of the aperture.

The tool of the present invention includes, in general, guide means for fitting into an aperture through a body, the guide means having a major axis which is maintained in alignment with the longitudinal axis of the aperture through the body when the guide means is fitted into the aperture; cutting means for selectively cutting material from the circumference of the aperture through the body; and attachment means attaching said cutting means to said guide means for arranging said cutting means at a specific location relative to the longitudinal axis of the guide means.

DESCRIPTION OF THE PREFERRED EMBODIMENT

Figure 1:
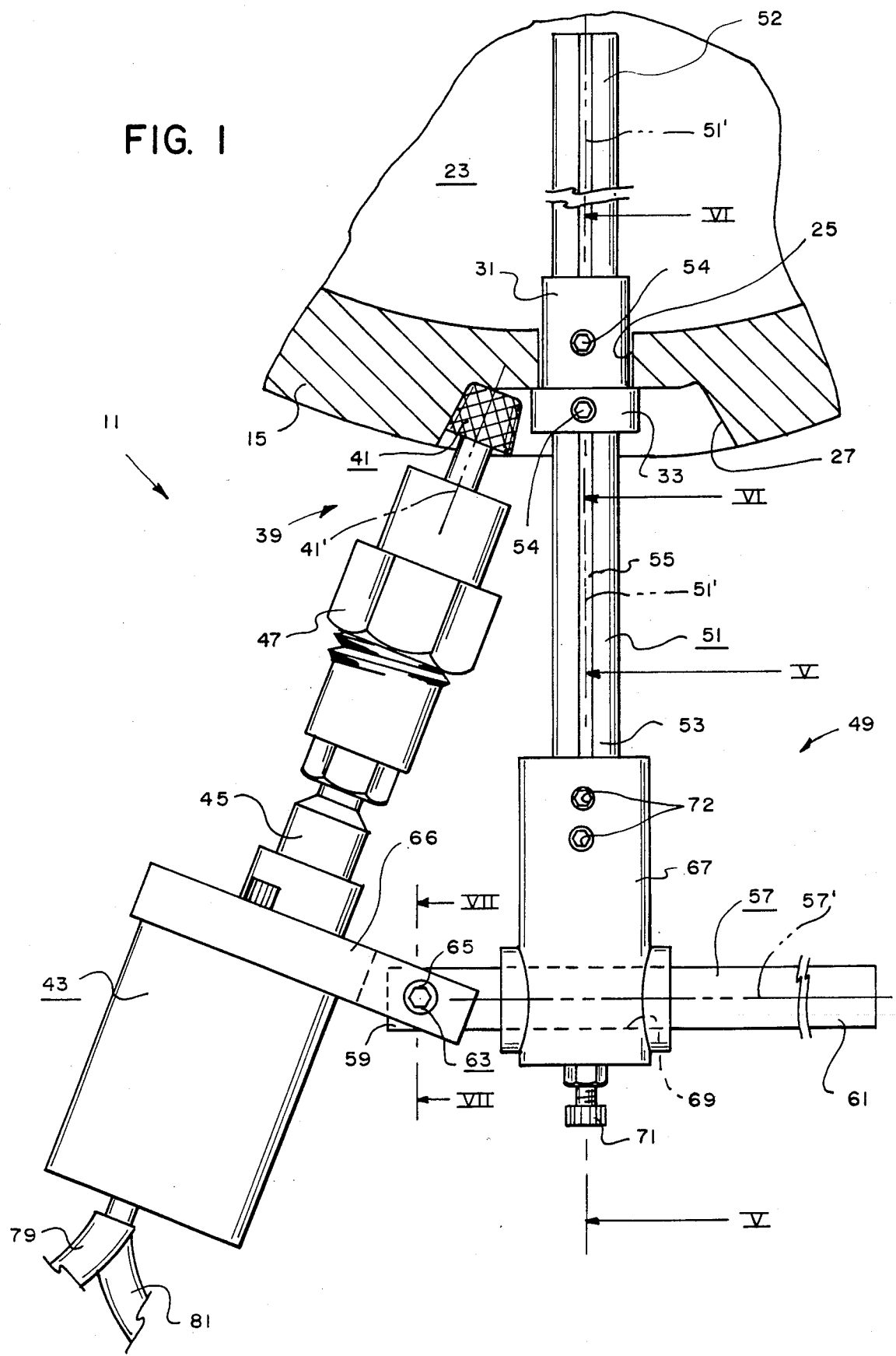
FIG. 1 is a somewhat diagrammatic elevational view of a portion of the tool of the present invention shown in connection with a portion of a boiler header.

The tool 11 of the present invention is used to remove metal, or the like, from a body about the circumference of an aperture through the body. The preferred embodiment of the tool 11 of the present invention is for use in steam plants, and the like, to remove an existing boiler tube 13 from a boiler header 15 and prepare the header 15 to receive a replacement tube 13. The tube 13 may consist of a typical metal pipe having a hollow interior 17 through which steam, etc., can pass. The end 19 of the tube 13 that is attached to the header 15 is preferably joined to the header 15 with a weld W as will now be apparent to those skilled in the art. The header 15 may also consist of a metal pipe having a hollow interior 23 through which steam, etc., can pass. The interior 23 of the header 15 is typically relatively large as compared to the interior 17 of the tube 13. The tube 13 is coupled to the header 15 in a manner which allows steam, etc., to pass between the interior 17 of the tube 13 and the interior 23 of the header 15. More specifically, the header 15 has a transverse aperture 25 through the side wall thereof of approximately the same diameter as the interior 17 of the tube 13, and the tube 13 is attached to the header 15 with the interior 17 aligned with the aperture 25 to allow the passage of steam, etc., therebetween. The aperture 25 has a longitudinal axis 25' and preferably has an enlarged or counterbored outer end 27 sized and shaped so as to receive the end 19 of the tube 13. The side walls of the outer end 27 of the aperture 25 are preferably bevelled so as to receive the end 19 of the tube 13 to allow a strong weld W to be used to join the tube 13 to the header 15 as will now be apparent to those skilled in the art.

Figure 2:
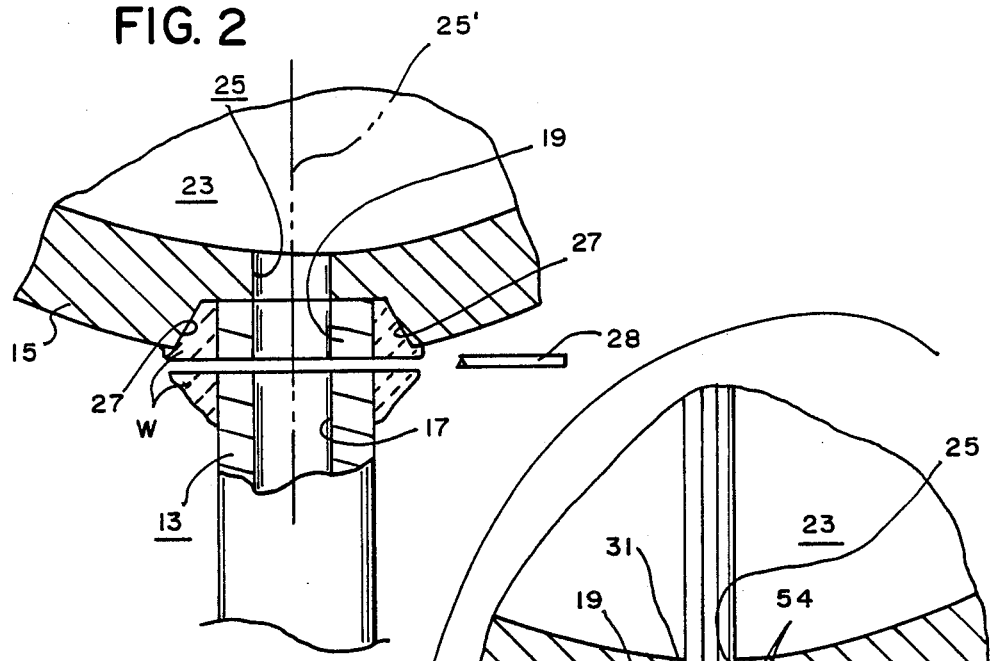
FIG. 2 is a somewhat diagrammatic sectional view of a portion of a boiler header and boiler tube showing the boiler tube being cut from the boiler header.
Figure 3:
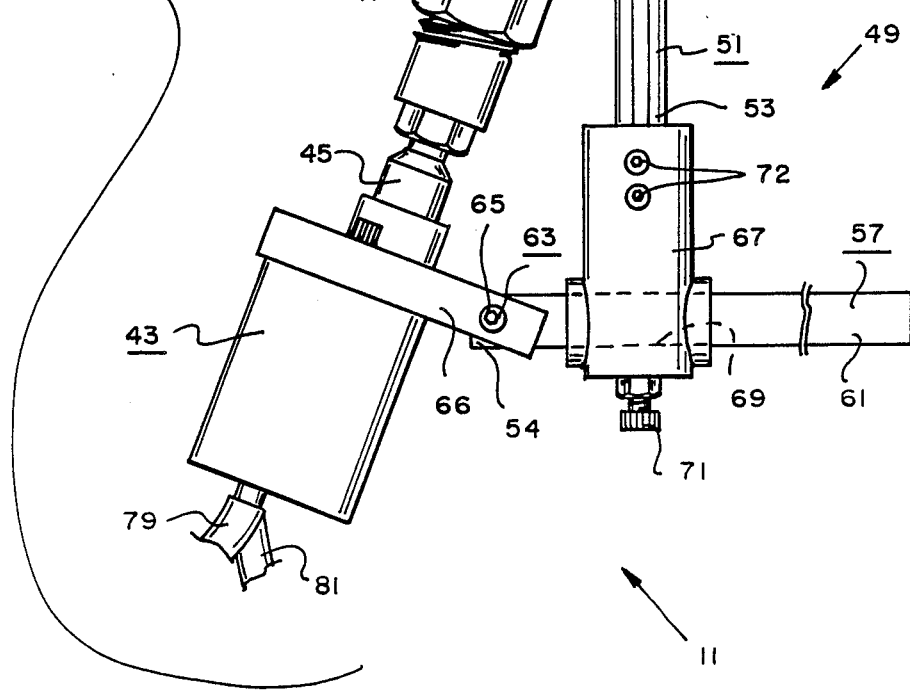
FIG. 3 is an elevational view similar to FIG. 1 but showing the combination in an initial stage.
Figure 4:
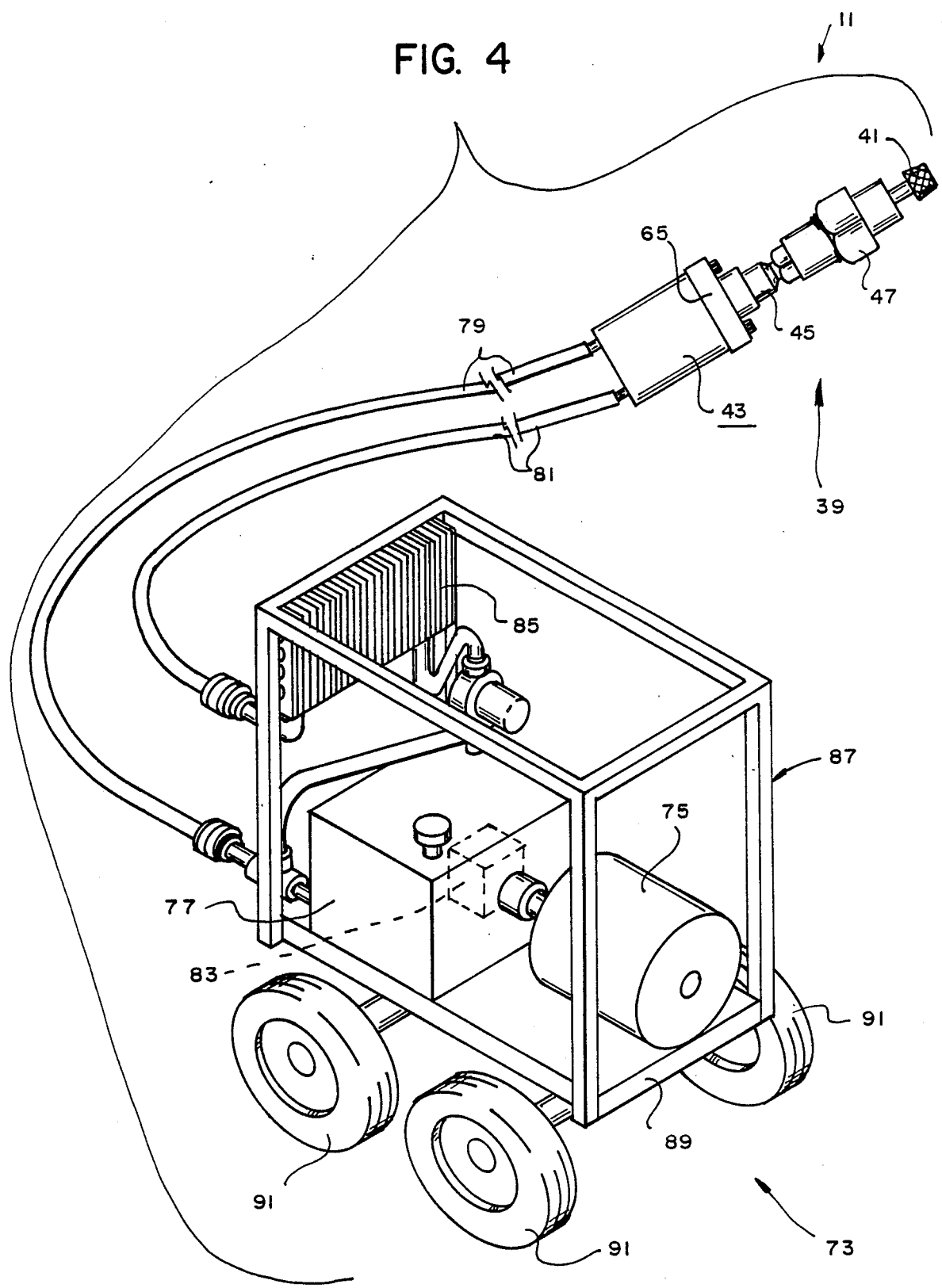
FIG. 4 is a perspective view of the tool of the present invention.
Figure 5:
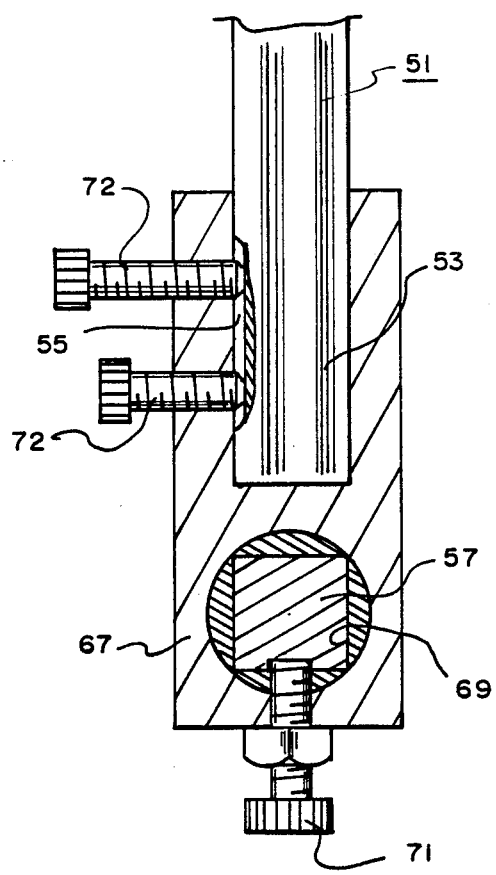
FIG. 5 is a sectional view substantially as taken on line V—V of FIG. 1.
Figure 6:
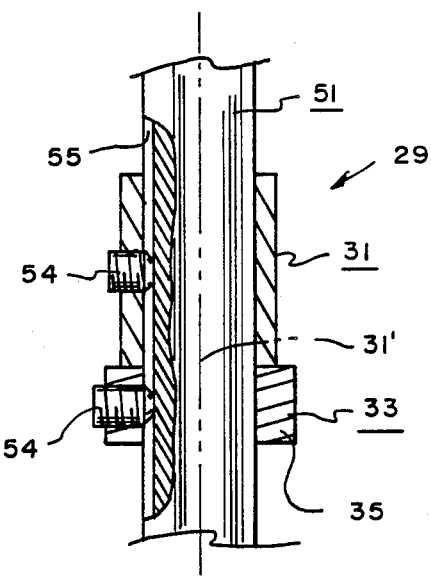
FIG. 6 is a sectional view substantially as taken on line VI—VI of FIG. 1.
Figure 7:
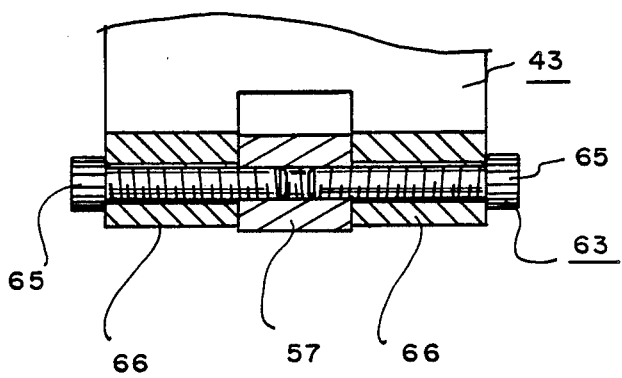
FIG. 7 is a sectional view substantially as taken on line VII—VII of FIG. 1.

When it is desired to replace the existing boiler tube 13 with a replacement boiler tube 13, the first step is normally to cut the existing boiler tube 13 off using a typical saw 28, or the like, as close to the header 15 as possible (see FIG. 2). Such a method leaves a portion of the tube 13 (i.e., the end 19) and the weld W attached to the header 15. The tool 11 of the present invention is used to remove any remaining portion of the existing boiler tube 13 and the weld W and to prepare the outer end 27 of the aperture 25 of the header 15 to receive a replacement tube 13.

The tool 11 includes a guide means 29 for fitting into the aperture 25 through the wall of the header 15. The guide means 29 has a major axis which is maintained in substantial alignment with the longitudinal axis 25' of the aperture 25 when the guide means 29 is fitted into the aperture 25. The guide means 29 preferably includes a bushing member 31 having a longitudinal axis 31' and sized to fit into the aperture 25 in a manner which insures that the longitudinal axis 31' of the bushing member 31 is substantially aligned with the longitudinal axis 25' of the aperture 25 when the bushing member 31 is inserted into the aperture 25 and which allows the bushing member 31 to rotate within the aperture 25. Thus, both the aperture 25 and bushing member 31 are preferably circular in cross section with the bushing member 31 having a slightly smaller diameter than the aperture 25.

The tool 11 may include a stop means 33 for limiting the insertion of the bushing member 31 into the aperture 25. The stop means 33 may consist of a flange member 35 attached to the bushing member 31 for contacting the bottom of the outer end 27 of the aperture 25 to prevent the bushing member 31 from being inserted completely through the aperture 25 into the interior 23. The bushing member 31 and flange member 35 may be constructed by, for example, being machined out of metal.

The tool 11 includes a metal removing means 39 for removing metal. The metal removing means 39 preferably includes a rotatable cutting tool 41 for selectively removing the remaining portion of the end 19 of the tube 13 and the weld W, and a motor 43 for rotating the cutting tool 41. The motor 43 has a rotatable drive shaft 45 to which the cutting tool 41 is attached. The cutting tool 41 has a longitudinal axis 41'. Preferably, a typical collet 47 is fixedly attached to the drive shaft 45 for rotation therewith and the cutting tool 41 is attached to the collet 47 in a manner which allows quick replacement of the cutting tool 41 as will now be apparent to those skilled in the art. The motor 43 is preferably a hydraulic motor capable of rotating the cutting tool 41 at least 3500 revolutions per minute and preferably producing 11 horse power at 10,000 revolutions per minute. The cutting tool 41 preferably rotates at 10,000 to 11,000 revolutions per minute.

The tool 11 includes attachment means 49 for attaching the metal removing means 39 to the guide means 29 and for allowing the metal removing means 39 to be rotated about the axis of the guide means 29 to remove metal from the header 15 about the circumference of the outer end 27 of the aperture 25. The attachment means 49 preferably includes an elongated shaft member 51 having a longitudinal axis 51', a first end 52 and a second end 53. The bushing member 31 and stop means 33 are movably attached to the shaft member 51 by set screws 54 or the like. The bushing member 31 and stop means 33 may be removable from the shaft member 51 and the tool 11 may include different size bushing members 31 and stop members 33 for use with different size apertures 25. The shaft member 51 may be provided with a flat 55 on the outer face thereof for allowing the set screws 54 to securely attach the bushing member 31 and stop means 33 thereto as will now be apparent to those skilled in the art.

The attachment means 49 preferably includes a cross bar member 57 having a longitudinal axis 57', havng a first end 59 for being pivotally coupled to the motor 43 and having a second end 61. A pivot means 63 is preferably provided to adjustably secure the mtoor 43 to the first end of the cross bar member 57. The pivot means 63 may consist of bolts 65 extending through a body portion 66 of the motor 43 and through the first end 59 of the cross bar member 57 whereby the motor 39 can be pivoted relative to the cross bar member 57 when the bolt 65 is loose and whereby the motor 39 is securely fixed to the cross bar member 57 when the bolt 65 is tight as will now be apparent to those skilled in the art.

The attachment means 49 preferably includes a slide member 67 slidably mounted on the cross bar member 57 for being moved between the first and second ends 59, 61 of the cross bar member 57. The slide member 67 preferably has a transverse aperture 69 therethrough for slidably receiving the cross bar member 57. A bolt 71 may be provided to selectively lock the slide member 67 to the cross bar member 57 as will now be apparent to those skilled in the art. The second end 53 of the shaft member 51 is preferably fixedly attached to the slide member 67 for movement with the slide member 67 between the first and second ends 59, 61 of the cross bar member 57. The second end 53 of the shaft member 51 may be fixed to the slide member 67 in any manner now apparent to those skilled in the art, such as by bolts 72, etc.

The tool 11 preferably includes a portable hydraulic drive means 73 for activating the motor 43. The drive means 73 preferably includes a drive motor 75 which may consist of a typical electric motor, or the like, a reservoir 77 of hydraulic fluid, a hydraulic fluid feed line 79 for extending from the reservoir 77 to the motor 43, a hydraulic fluid return line 81 for extending from the motor 43 to the reservoir 77, and a hydraulic pump 83 of any typical construction well known to those skilled in the art for being coupled to the reservoir 77 through the feed line 79 to the motor 43 causing the drive shaft 45 of the motor 43 to rotate. The hydraulic fluid pumped to the motor 43 will then return to the reservoir 77 through the return line 81. The feed and return lines 79, 81 preferably consist of elongated, flexible rubber hoses, or the like. The drive means 73 may include a radiator means 85 of any typical construction well known to those skilled in the art for cooling the hydraulic fluid. The drive means 73 preferably includes a cart member 87 on which the drive motor 75, reservoir 77, hydraulic pump 83 and radiator means 85 are mounted, and wheels 91 rotatably mounted to the frame 89 for allowing the drive means 73 to be easily moved.

The method of removing an existing tube 13 from a header 15 using the tool 11 includes the first step of cutting the tube 13 from the header 15 at a point as close to the header 13 as possible using a standard saw 28, or the like. Next, the appropriate-sized bushing member 31 and stop means 33 are secured to the shaft member 51 depending on the size of the aperture 25, and the tool 11 is adjusted until the cutting tool 41 properly engages the remaining portion of the end 19 of the boiler tube 13 by adjusting the position of the bushing member 31 and stop means 33 on the shaft member 51 and by adjusting the angle and position of the cutting tool 41 through the pivot means 63 and slide means 67. The first end 52 of the shaft member 51 is inserted through the aperture 25 until stopped by the stop means 33. With the drive means 73 activated, the cutting tool 41 will rotate at a speed of at least 3500 revolutions per minute and preferably at speeds of approximately 10,000 to 11,000 revolutions per minute. The tool 11 is then manually rotated in the aperture 25 while being manually pressed into the header 15 until the flange member 35 stops movement of the tool 11 into the header 15 whereupon all traces of the remaining portion of the end 19 of the boiler tube 13 will be removed from the header 15 and the header 15 will be ready for a new tube 13 to be welded thereto.

Although the present invention has been described and illustrated with respect to a preferred embodiment and use, it is not to be so limited since changes and modifications can be made therein which are within the full intended scope thereof.

I claim:

1. A tool for removing material from a body about the circumference of an aperture through the body; said tool comprising:

(a) guide means for fitting into said aperture through said body, said guide means having a major axis which is maintained in substantial alignment with the longitudinal axis of said aperture through said body when said guide means is fitted into said aperture;

(b) cutting means for selectively cutting material from said body about the circumference of said aperture through said body; and (c) attachment means attaching said cutting means to said guide means for arranging said cutting means at a specific location relative to said longitudinal axis of said guide means; said guide means including a bushing member for being inserted into at least a portion of said aperture through said body, said bushing member having substantially the same cross-sectional shape and size as at least a portion of said aperture through said body for insuring that the longitudinal axis of said bushing member is substantially aligned with the longitudinal axis of at least a portion of said aperture through said body and for allowing said bushing member to rotate within said aperture through said body.

2. The tool of claim 1 in which is included stop means for limiting the insertion of said bushing member into said aperture through said body.

3. The tool of claim 2 in which said stop means includes a flange member attached to said bushing member for contacting a portion of said body when said bushing member is inserted into said aperture through said body.

4. A tool for removing material from a body about the circumference of an aperture through the body; said tool comprising:

(a) guide means for fitting into said aperture through said body, said guide means having a major axis which is maintained in substantial alignment with the longitudinal axis of said aperture through said body when said guide means is fitted into said aperture;

(b) cutting means for selectively cutting material from said body about the circumference of said aperture through said body; said cutting means including a rotatable cutting tool and a motor for rotating said cutting tool at a speed of at least 3500 revolutions per minute;

(c) attachment means attaching said cutting means to said guide means for arranging said cutting means at a specific location relative to said longitudinal axis of said guide means; said guide means including a bushing member for being inserted into at least a portion of said aperture through said body, said bushing member having substantially the same cross-sectional shape and size as at least a portion of said aperture through said body for insuring that the longitudinal axis of said bushing member is substantially aligned with the longitudinal axis of at least a portion of said aperture through said body and for allowing said bushing member to rotate within said aperture through said body; and (d) stop means for limiting the insertion of said bushing member into said aperture through said body; said stop means includes a flange member attached to said bushing member for contacting a portion of said body when said bushing member is inserted into said aperture through said body; said attachment means including an elongated shaft member and a cross bar member movably attached to said shaft member with the longitudinal axis of said cross bar member located substantially at right angles to the longitudinal axis of said shaft member, said bushing member and said flange member being movably attached to said shaft member with the longitudinal axis of said shaft member being substantially aligned with the longitudinal axis of said bushing member, said motor being movably attached to said cross bar member.

5. The tool of claim 4 in which said attachment means includes a slide member slidably mounted on said cross bar member and fixedly mounted to said shaft member to slidably attach said motor relative to said shaft member.

* * * * *